July 30, 1929.  E. M. KLING  1,722,985
FLUID DISTRIBUTING APPARATUS
Filed April 10, 1928
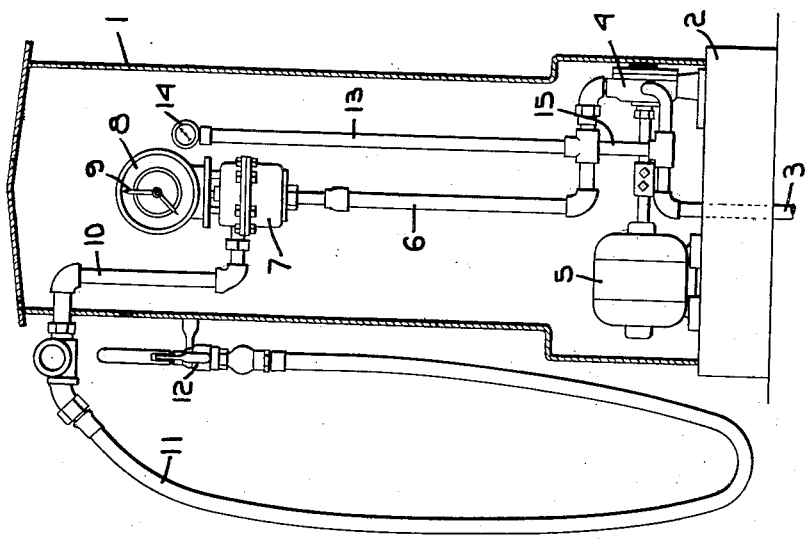
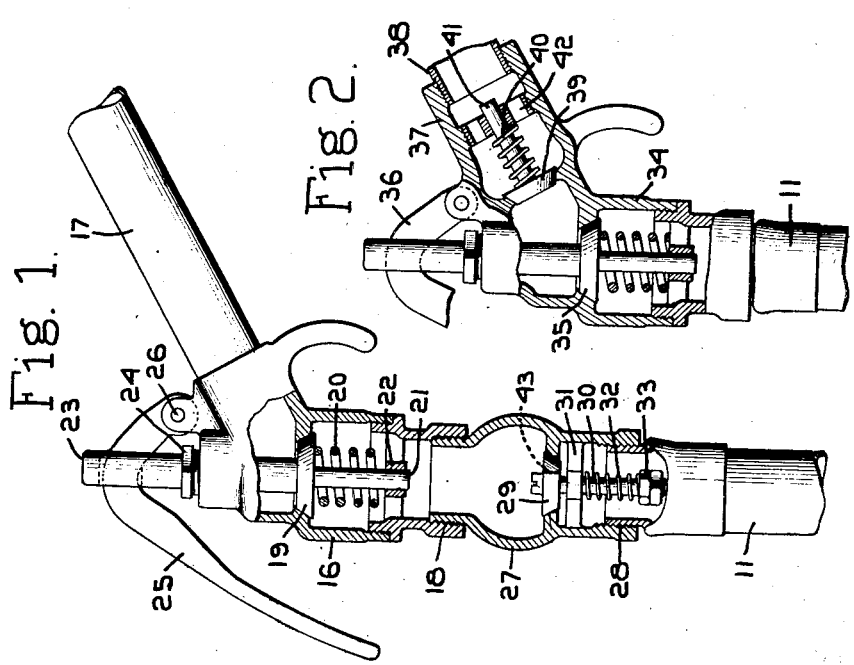
Inventor.
Elmer M. Kling
by Heard Smith & Tennant.
Attys.

Patented July 30, 1929.

1,722,985

UNITED STATES PATENT OFFICE.

ELMER M. KLING, OF BRIGHTON, MASSACHUSETTS, ASSIGNOR TO MOORE AND KLING, INC., OF BOSTON, MASSACHUSETTS, A CORPORATION OF MASSACHUSETTS.

FLUID-DISTRIBUTING APPARATUS.

Application filed April 10, 1928. Serial No. 268,848.

This invention relates to an apparatus for distributing fluid through a pipe under pressure and to means for controlling the discharge thereof from the pipe. More particularly the invention has to do with the type of apparatus employed at filling stations for distributing gasoline and similar liquids.

Gasoline filling stations are coming into use in which the gasoline is forced by pressure from the supply tank, as, for example, by a motor-driven pump and in which the quantity delivered is measured by a flow meter with the flow controlled by a hand-operated valve at the end of the usual pipe or hose. One important objection to this type of apparatus lies in the possibility of draining out from the hose the gasoline or other liquid which stands between the flow meter and the nozzle and which may amount to two quarts or more without the meter making any record thereof. This gives dishonest operators and others an opportunity continuously to withdraw substantial amounts of the liquid. As this is done universally to the disadvantage of the customers, such distributing apparatus would not meet the approval of sealers of weights and measures or other governmental inspectors.

One of the chief objects of the invention is, therefore, to provide a construction which will automatically prevent discharge of the gasoline or other liquid from the pipe hose without the quantity thus discharged being simultaneously recorded by the meter.

The object of the invention is further to provide in addition to the usual hand-operated valve in the nozzle adjacent thereto another valve normally closed by a spring. Thus when the hand-operated valve is opened, no liquid can flow past the spring-closed valve unless the pressure in the pipe is greater than the force of this spring and when this is the case, such flow will be recorded by the flow meter.

The object of the invention is further to provide a simple and efficient construction readily attached to and made a part of or built into the usual nozzle employed in such apparatus.

The object of the invention is further by means of the additional spring-closed valve to prevent the admission of air through the discharge pipe to the apparatus.

These and other objects and features of the invention will appear more fully from the accompanying description and drawings and will be particularly pointed out in the claims.

The drawings represent more or less diagrammatically a filling station apparatus as designed for the supply of gasoline of the type in question, together with details showing preferred forms of the present invention.

In the drawings:

Fig. 1 is a view in elevation and largely in longitudinal cross section of a nozzle attached to the end of a hose pipe and embodying a preferred form of the invention.

Fig. 2 is a view similar to Fig. 1 illustrating another form of the invention.

Fig. 3 is a view in elevation and partially in vertical cross section of the filling station apparatus.

The construction illustrated in Fig. 3 is that suitable for a filling station for distributing gasoline from an underground tank. The main parts of the apparatus are enclosed within a suitable casing 1 supported from a base 2 resting on the ground. The supply pipe 3 leads from the tank underground into the casing to a pump 4 of suitable character which may be a suction pump connected to and driven by an electric motor 5. From the pump 4 extends upwardly a pipe 6 to a flow meter 7 having a dial 8 and pointers 9 for recording the quantity of the flow passing through the meter. From the meter a pipe 10 extends to the outside of the casing and to this pipe is shown connected the usual flexible hose pipe 11 having at its end a nozzle indicated as a whole at 12. The portion of the apparatus from the pipe 6 onward may be duplicated, if desired, and operated from the same pump, but it is sufficient to show, as here, a single unit. A pipe 13 extends upward from beyond the pump 4 and is provided with a pressure gauge 14. This indicates the amount of pressure in the system produced by the pump. A by-pass 15 is provided between the pipe 6 and the supply pipe 3 around the pump having therein a suitable relief valve so that if an undesirable pressure is built up by the pump, the fluid will simply circulate through the pump and by-pass.

It will be recognized that with an apparatus of this sort the dial 8 and pointer 9 will record the quantity of liquid flowing through the meter and that to produce this flow a certain pressure is required. This pressure is indicated on the gauge 14 and is usually at least two pounds in this type of apparatus. Under ordinary conditions, the pipe is filled with liquid up to the nozzle 12. To deliver the liquid the motor is started and the pressure built up to the desired amount. Then when the nozzle is opened, the flow begins and is recorded on the dial 8. With the apparatus operating in this way, the quantity discharged from the nozzle is accurately recorded on the dial of the flow meter. If, however, after a sale has been made, the pump 5 is stopped, as is usually done, the pressure producing source is stopped. If, now, the operator opens the nozzle 12, any pressure in the system will immediately be relieved and all the liquid in the pipe 11, which is usually a substantial amount running to two quarts or more, may be drained out by gravity through the nozzle. This, however, will produce no flow through the meter and make no further record on the dial 8. Then when the next sale is made and the motor 5 is started, the liquid will be forced through the meter to fill the pipe 11 and this flow will be recorded on the dial, but there will be no discharge from the hose until it has been filled. Thus the customer will actually receive two quarts or more less fluid than is indicated by the dial.

In the construction shown in Fig. 1 at the upper portion is illustrated a familiar type of nozzle comprising the main casing 16 having screwed and sealed therein at the discharge end the discharge nozzle 17. This casing is usually threaded at 18 to be attached directly to the pipe 11. In the casing 16 is mounted a valve 19 shown as a bevel valve cooperating with a bevel seat. This valve as shown opens inwardly. It is held outwardly by a helical spring 20 on the valve stem 21 between the valve proper 19 and a suitable guide 22. This valve is hand or manually operated. For that purpose the valve stem has a prolongation 23 extending through a stuffing box 24 in the casing 16 and a cam lever 25 fulcrumed at 26 on the casing passes through the prolongation 23 so that when this lever is pressed toward the casing, the valve will be opened against its spring 20.

In the present invention, in addition to the hand-operated valve, there is provided in line therewith a spring-closed valve. When the hand-operated valve is opened, this additional valve is arranged to open automatically whenever the pressure in the pipe is greater than the force of its closing spring. Consequently by setting this spring to have a force somewhat less than the minimum pressure exerted by the pump to pass the liquid through the flow meter, this valve will be closed at all times excepting when there is sufficient pressure in the system to operate the flow meter.

The auxiliary valve may be arranged either ahead or behind the hand-operated valve. In the former position, no liquid can pass out of the nozzle without being recorded by the flow meter, while in the latter position, it is possible to drain out the small amount of liquid in the nozzle between the two valves, but this amount is so small or may readily be made so small as to be well within the tolerance allowed in the measurement effected by such apparatus.

Referring now to Fig. 1, the auxiliary valve is located behind the hand-operated valve and in the construction illustrated it is mounted in an auxiliary casing 27 secured to and in effect forming a part of the nozzle casing 16. For that purpose it is shown threaded into the main casing at 18, this auxiliary casing in turn being threaded at 28 to the pipe 11. The auxiliary valve is shown at 29 of the bevel type fitting a bevel seat in the casing and opening outward. Its stem 30 passes through a guide 31 in the casing and a light helical spring 32 is seated on the stem between this guide and nuts 33 on the end of the stem. In the case referred to where it is assumed that a two-pound pressure is desirable to force the liquid through the flow meter, this spring would be set to exert a force of something less than two pounds. Consequently until pressure is built up in the system sufficiently to overcome the force of the spring 32, the valve 29 will be maintained closed and no liquid can pass this valve. If the pressure becomes sufficient to open the valve, then flow will simultaneously take place through the meter 7 and will simultaneously be recorded on the dial. Thus no liquid can pass the valve 29 without simultaneously being recorded by the flow meter.

The construction shown in Fig. 2 involves the same general principles. In this form the auxiliary valve is placed ahead of the hand-operated valve and in an integral part of the main casing of the nozzle. In this construction the main casing 34 of the nozzle, the valve 35 and lever 36 for operating it are all as hereinbefore described. The portion of the casing 34 beyond the valve 35 is enlarged somewhat as shown at 37 and the discharge nozzle 38 is connected thereto as before. In the enlarged portion 37 of the casing is mounted the auxiliary valve 39, in this case also opening outward. A similar spring 40 on the valve stem 41 is seated between the valve 39 and a guide 42 removably secured in the casing 37. The spring 40 is calibrated in accordance with the principles already described. It will be seen that this valve 39 will not open unless the hand-operated valve 35 is open and cannot then open unless the pressure in the pipe is greater than the force of the spring or, in other words, sufficient to produce flow through the meter. Consequently no liquid can pass the valve 39 and no liquid be discharged from the nozzle without being recorded by the flow meter.

In both cases, the auxiliary valve also prevents any passage of air back into the system through the nozzle, which is of advantage.

In order to allow ready opening of the valve 19 in the construction such as illustrated in Fig. 1, a very small hole 43 should be made in valve 29, otherwise it would be necessary to compress the air or liquid in the space between the two valves to open valve 19. To discharge the liquid in the hose through such a hole would require such a length of time that this hole may be considered negligible in its effect upon the invention.

The pressure of the springs controlling the valve 29 in Fig. 1 or 39 in Fig. 2 may be accurately determined by the nuts 33 in the former case or by adjusting the guide 42 in the latter case or by any suitable means.

Having thus described the invention, what is claimed as new, and desired to be secured by Letters Patent, is:

1. A liquid distributing apparatus comprising a liquid container, a pipe leading therefrom, a flow-recording meter in said pipe, means to force the liquid from the container through the pipe and meter and a nozzle at the end of the pipe having in line two valves, one hand-operated and the other spring-closed and opening automatically when the pressure in the pipe is greater than the force of its closing spring whereby upon manipulation of the hand-operated valve no liquid can pass the automatic valve without simultaneously being recorded by the flow meter.

2. A liquid distributing apparatus comprising a liquid container, a pipe leading therefrom, a flow-recording meter in said pipe, means to force the liquid from the container through the pipe and meter and a nozzle at the end of the pipe having in line two spring-closed valves, one hand-operated and opening inward and the other automatic and opening outward when the pressure in the pipe is greater than the force of its closing spring whereby upon manipulation of the hand-operated valve no liquid can pass the automatic valve without simultaneously being recorded by the flow meter.

3. A liquid distributing apparatus comprising a liquid container, a pipe leading therefrom, a flow-recording meter in said pipe, means to force the liquid from the container through the pipe and meter and a nozzle at the end of the pipe having in line and closely adjacent two spring valves, the one nearer the discharge end being hand-operated and opening inward and the other opening outward when the pressure in the pipe is greater than the force of its closing spring whereby upon manipulation of the hand-operated valve no liquid can be discharged from the pipe without being simultaneously recorded by the flow meter except a small quantity equal to the space volume between the valves.

4. A liquid distributing apparatus comprising a liquid container, a pipe leading therefrom, a flow-recording meter in said pipe, means to force the liquid from the container through the pipe and meter, a nozzle at the end of the pipe having therein a hand-operated valve, a valve casing and means for attaching it to the nozzle in line therewith to form a part thereof, a valve and a closing spring therefor in the casing, the said valve opening automatically when the pressure of the liquid is greater than the force of its closing spring whereby upon manipulation of the hand-operated valve no liquid can pass the automatic valve without simultaneously being recorded by the flow meter.

5. A nozzle for a pipe through which fluid is discharged under pressure comprising a casing to be attached to the pipe, a manually operated valve opening inwardly in said casing, a spring acting to close said valve, another valve in line with said former valve in said casing opening outwardly and having a relief port therein, a spring acting to maintain the latter valve closed and means to adjust the tension of said spring, whereby said relief port will permit the former valve to be opened against the fluid between the two valves and when opened no fluid can pass the latter valve until the pressure thereof is sufficient to overcome its closing spring.

6. A fluid distributing apparatus comprising a container, a pipe leading therefrom, a flow meter in said pipe, means to force fluid from the container through the pipe and meter, a nozzle at the end of the pipe having two valves, one of said valves being spring closed and opening when the pressure in the pipe is greater than the force of its closing spring, whereby upon opening of the other valve no fluid can pass the spring controlled valve without operating the flow meter.

In testimony whereof, I have signed my name to this specification.

ELMER M. KLING.